United States Patent
Baxter, Jr. et al.

(10) Patent No.: US 7,534,193 B2
(45) Date of Patent: May 19, 2009

(54) COUPLING ASSEMBLY

(75) Inventors: Ralph Woodward Baxter, Jr., Fort Wayne, IN (US); William Gordon Hunt, Tecumseh, MI (US); Randy L. Sommer, Monroeville, IN (US)

(73) Assignee: Dana Automotive Systems, Group, LLC, Toledo, OH (US)

( * ) Notice: Subject to any disclaimer, the term of this patent is extended or adjusted under 35 U.S.C. 154(b) by 443 days.

(21) Appl. No.: 11/520,026

(22) Filed: Sep. 13, 2006

(65) Prior Publication Data
US 2008/0064569 A1 Mar. 13, 2008

(51) Int. Cl.
*F16D 25/08* (2006.01)
*B60W 10/04* (2006.01)
(52) U.S. Cl. ..................... 477/35; 192/85 C
(58) Field of Classification Search ............ 475/86, 475/88; 477/35
See application file for complete search history.

(56) References Cited

U.S. PATENT DOCUMENTS

| 3,724,289 | A | 4/1973 | Kennicutt |
| 4,736,821 | A | 4/1988 | Ries |
| 4,899,622 | A | 2/1990 | Kobayashi |
| 5,535,850 | A | 7/1996 | Tar et al. |
| 5,709,135 | A | 1/1998 | Baxter |
| 6,502,665 | B1 | 1/2003 | Brehob |
| 6,672,420 | B2* | 1/2004 | Porter ........................ 180/249 |
| 6,814,681 | B2* | 11/2004 | Porter ........................ 475/221 |
| 6,966,396 | B2* | 11/2005 | Forsyth et al. .............. 180/249 |
| 2003/0096670 | A1* | 5/2003 | Hunt ............................. 475/86 |
| 2005/0167228 | A1* | 8/2005 | Baxter, Jr. .................... 192/49 |
| 2006/0169564 | A1 | 8/2006 | Krisher et al. |

FOREIGN PATENT DOCUMENTS

| DE | 41 41 792 A1 | 6/1993 |
| DE | 42 02 427 A1 | 8/1993 |
| DE | 10 2005 058 883 A1 | 6/2006 |
| JP | A 3-50028 | 3/1991 |
| WO | WO 02/26517 A1 | 4/2002 |

* cited by examiner

*Primary Examiner*—Dirk Wright
(74) *Attorney, Agent, or Firm*—Marshall & Melhorn, LLC

(57) ABSTRACT

A coupling assembly comprises an input shaft driven by a prime mover, at least one output shaft drivingly coupled to the input shaft, a fluid pump selectively driven by the input shaft through an auxiliary clutch, a friction clutch for selectively frictionally coupling the input shaft with the at least one output shaft, and a fluid clutch actuator for operating the friction clutch between a disengaged condition and an engaged condition. The fluid pump selectively communicates with the fluid clutch actuator for setting the friction clutch assembly in the engaged condition. The fluid pump is mounted to the input shaft.

22 Claims, 3 Drawing Sheets

COUPLING ASSEMBLY

BACKGROUND OF THE INVENTION

1. Field of the Invention

The present invention relates to coupling assemblies, and more particularly to a coupling assembly comprising a friction clutch assembly actuated by a fluid pump driven through an auxiliary clutch.

2. Description of the Prior Art

Conventionally, coupling assemblies, such as automotive drive axles with differentials or transfer cases, well known in the prior art, are arranged in a mechanical power transmission system to operatively couple an input shaft to one or more output shafts. Such a device essentially distributes the torque provided by the input shaft between the output shafts.

Usually, the coupling assemblies use at least one frictional clutch between the input and output shafts. The frictional clutch may be selectively actuated by various fluid, such as hydraulic, actuator assemblies. The hydraulic actuator assemblies often include displacement pumps. The displacement pumps are usually in the form of internal gear pumps, such as gerotor pumps adapted to convert rotational work to hydraulic fluid pressure. The hydraulic actuator assemblies further include a hydraulic piston member for frictionally loading the friction clutch.

Recent advances in the art may require the disabling of the frictional clutch in certain conditions. One such system is the yaw stability control, which uses the vehicle's brakes to correct the trajectory of the vehicle during a turn. The impulse braking of the yaw stability control feature generates a speed difference between the wheels on either side of the vehicle. The limited slip feature will engage due to this speed difference and may interfere with the performance of the yaw stability control feature. There is therefore a need to disable the limited slip feature of the hydraulic limited slip differential during specified conditions to ensure proper performance of the devices like yaw stability control while also allowing the limited slip feature to be enabled at other specified conditions where traction may be needed and where yaw control is not essential. There is a problem with current hydraulically actuated limited slip differentials in that they do not have a simple on/off capability which is separate and distinct from the hydraulic pressure supply/control circuit actuating the clutch assemblies.

Typical coupling assemblies have no ability to disengage the hydraulic fluid pumps. However, the conventional hydraulic pumps can use several horsepower to drive the pump even when the system does not require additional pressure of fluid flow.

It is the intent of this invention to overcome the shortcomings of the prior art by providing an external control of the hydraulic pressure generated within a hydraulically actuated frictional clutch assembly in which the hydraulic pump can either be turned on or off, or set at any intermediate condition by controlling the hydraulic pressure supplied to the clutch actuator.

SUMMARY OF THE INVENTION

The present invention provides an improved coupling assembly. The coupling assembly in accordance with the present invention comprises an input shaft driven by a prime mover, at least one output shaft drivingly coupled to the input shaft, a friction clutch for selectively frictionally coupling the input shaft with the at least one output shaft, and a fluid clutch actuator assembly for operating the friction clutch between a disengaged condition and an engaged condition.

The fluid clutch actuator assembly includes a fluid pump mounted to the input shaft and selectively driven by the input shaft through an auxiliary clutch, and a fluid clutch actuator for engaging the friction clutch. The fluid pump selectively communicates with the fluid clutch actuator for setting the friction clutch assembly in the engaged condition by applying a fluid pressure generated by the fluid pump.

The friction coupling assembly in accordance with the present invention reduces parasitic losses in the coupling assembly and improves its efficiency.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
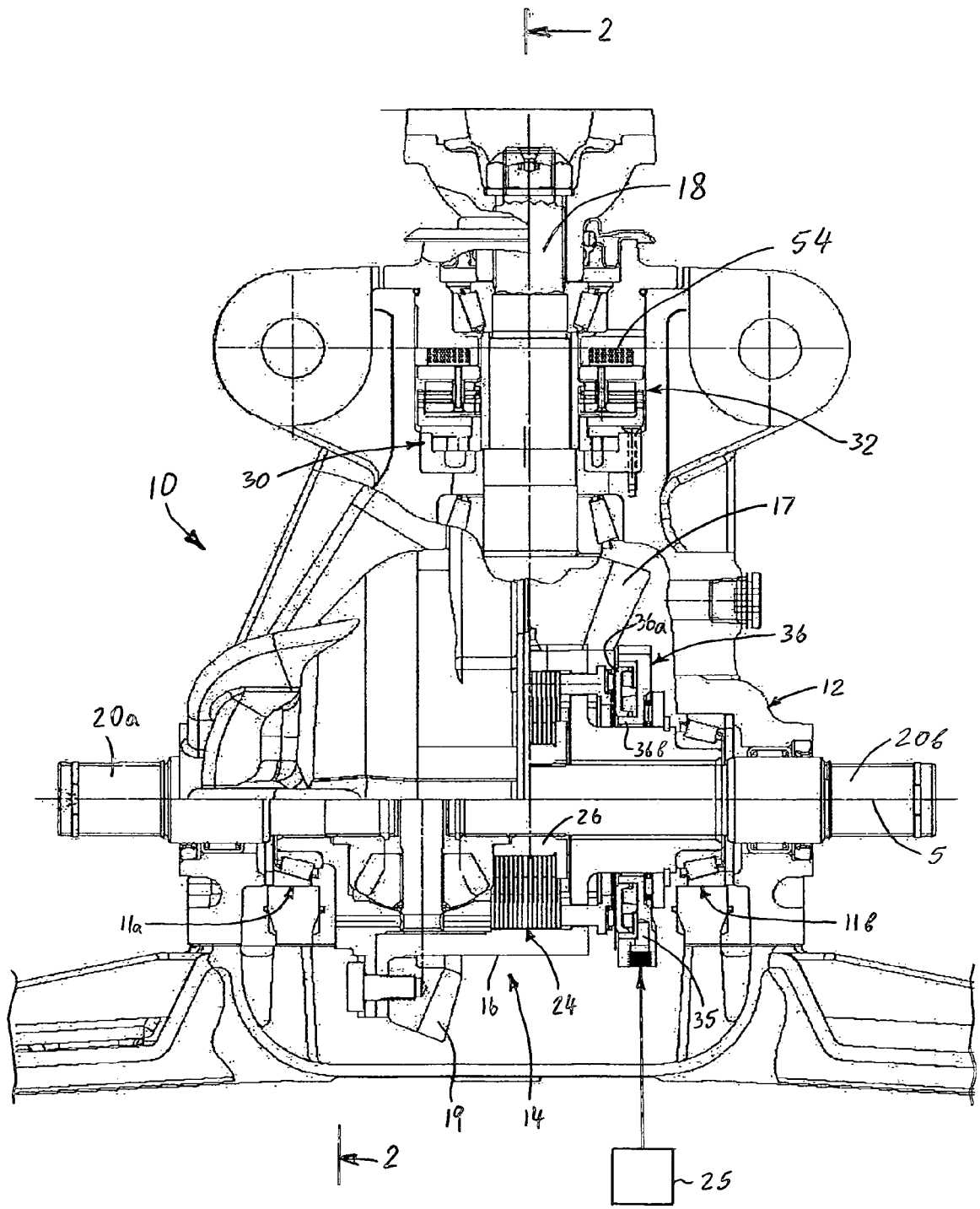
FIG. 1 is a sectional view of a drive axle assembly in accordance with the preferred embodiment of the present invention.

FIG. 1 schematically depicts a coupling assembly in the form of a vehicle drive axle assembly 10 including a selectively operable limited slip differential (LSD) assembly 14. However, it is to be understood that while the present invention is described in relation to the limited slip differential, the present invention is equally suitable for use in any other coupling assembly, including but not limited to transfer cases.

The differential assembly 14 comprises a differential case 16 supported within an axle housing 12 for rotation about a central axis 5 through roller bearings 11*a*, 11*b* and driven by a drive pinion gear 17 transmitting a drive torque from a prime mover, such as an internal combustion engine (not shown) to a ring gear 19. The ring gear 19 is bolted or otherwise secured to the differential case 16. The drive pinion gear 17 is integrally formed at an end of an input shaft (pinion shaft) 18.

The differential assembly 14 further includes a differential gear mechanism disposed within the differential case 16 is operatively coupled to output axle shafts 20*a* and 20*b* for allowing differential rotation thereof. Thus, the differential case 16 defines an input member, while the output axle shafts 20*a* and 20*b* define output members of the present invention. The differential gear mechanism disposed within the differential case 16 preferably includes a set of pinion gears rotatably supported on a pinion shaft secured to the differential case 16. The pinion gears engage a pair of opposite side gears adapted to rotate about the axis 5. The side gears are splined to the output axle shafts 20*a* and 20*b*.

The LSD assembly 14 also includes a limited slip device in the form of a fluidly, such as hydraulically, actuated friction coupling assembly including a friction clutch 24 that, when engaged, limits the differential speed between output axle shafts 20*a* and 20*b*, and an actuator assembly for axially loading the friction clutch 24.

As illustrated in detail in FIG. 1, the friction clutch 24 of the LCD 14 is disposed inside the differential case 16. The friction clutch 24, well known in the prior art, includes at least one outer, or first, friction plate and at least one inner, or second, friction plate. Preferably, the friction clutch 24 includes a set of alternating outer, or first, friction plates and inner, or second, friction plates. Conventionally, an outer circumference of the outer friction plates is provided with projections that non-rotatably engages corresponding grooves formed in an inner peripheral surface of the differential case 16. Similarly, an inner circumference of the inner friction plates is provided with projections that non-rotatably engage corresponding grooves formed in a clutch support ring 26, which in turn is splined to the associated axle shaft 20b. At the same time, both the outer friction plates and the inner friction plates are slideable in the axial direction. The outer clutch plates frictionally engage the inner clutch plates to form a coupling arrangement between the differential case 16 and the output axle shaft 20b. Thus, when the friction clutch 24 is loaded by the hydraulic actuator assembly, i.e. when the outer friction plates frictionally engage the inner friction plates, the relative rotation between the differential case 16 and the output axle shaft 20b is restricted.

Figure 3:
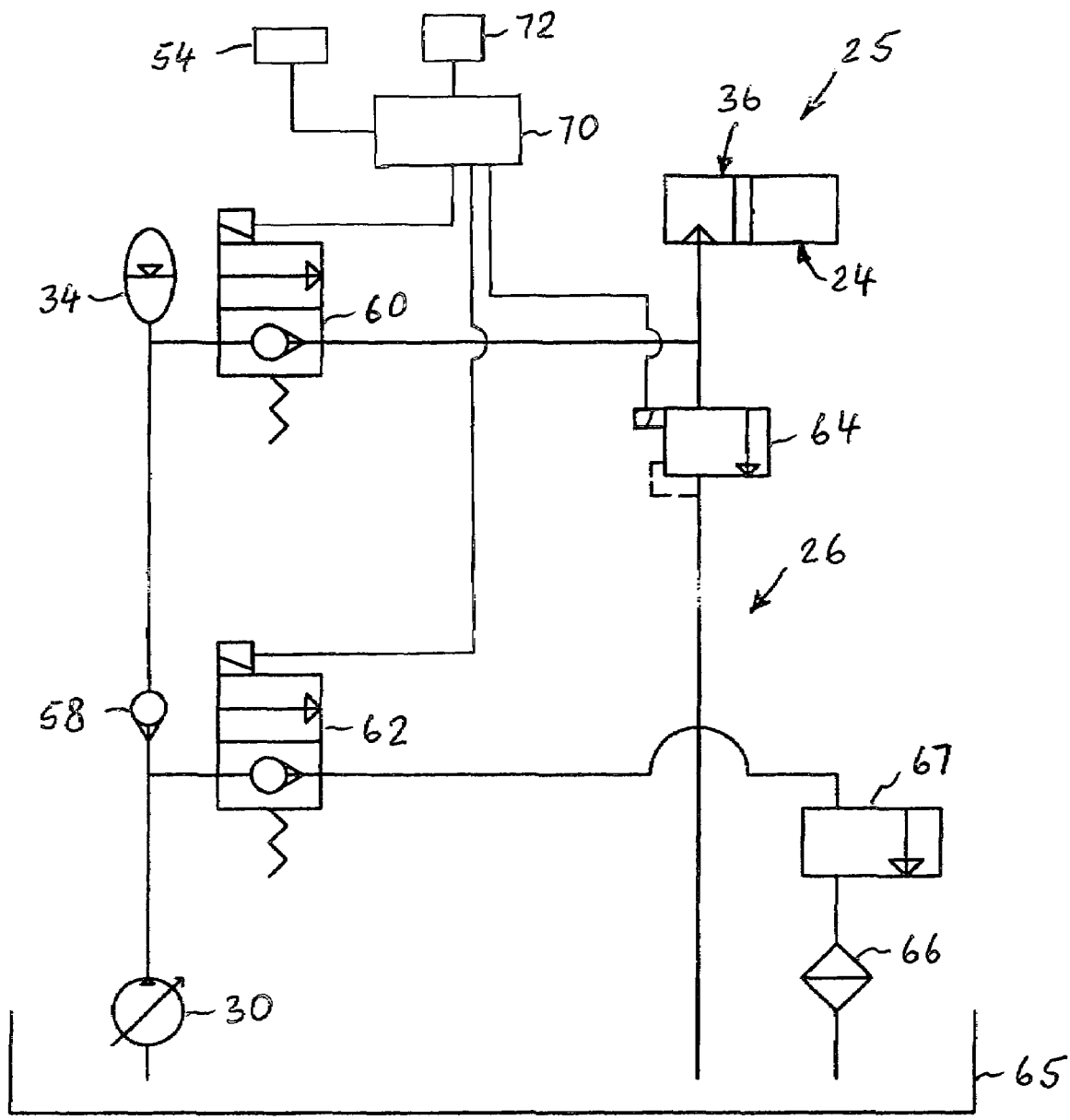
FIG. 3 is a schematic view of a hydraulic circuit of the drive axle assembly shown in FIG. 1 in accordance with the preferred embodiment of the present invention.

As illustrated in FIGS. 1 and 3, the friction clutch 24 is selectively actuated by a fluid clutch actuator assembly 25 for selectively operating the friction clutch 24 between a disengaged condition and an engaged condition. The fluid clutch actuator assembly 25 comprises a fluid pressure source 26 and a friction clutch actuator 36 in the form of piston assembly. In turn, the fluid pressure source 26 includes a fluid (preferably hydraulic) displacement pump 30, and a fluid (preferably hydraulic) pressure accumulator 34 (shown in FIG. 3) provided to be charged by the hydraulic pump 30. The piston assembly 36 is provided for axially loading (engaging) the friction clutch 24 using a fluid pressure generated by the hydraulic pump 30 or stored in the pressure accumulator 34. The hydraulic pump 30 is mounted circumferentially about the input shaft 18 concentrically therewith.

Preferably, the hydraulic displacement pump 30, employed to provide pressurized hydraulic fluid to actuate the friction clutch 24, is a gerotor pump. The gerotor pump 30 is well known in the art and includes an outer ring member 40, an outer rotor 42, and an inner rotor 44. The inner rotor 44 is rotatably mounted to the input shaft 18, and the outer ring member 40 is mounted within the axle housing 12. The inner rotor 44 has one less tooth than the outer rotor 42 so that when the inner rotor 44 is driven, it will drive the outer rotor 42, which can freely rotate within the outer ring member 40 eccentrically with respect to the inner rotor 44, thus providing a series of decreasing and increasing volume fluid pockets by means of which fluid pressure is created. It will be appreciated that any other appropriate type of hydraulic pump for generating hydraulic fluid pressure is within the scope of the present invention.

Figure 2:
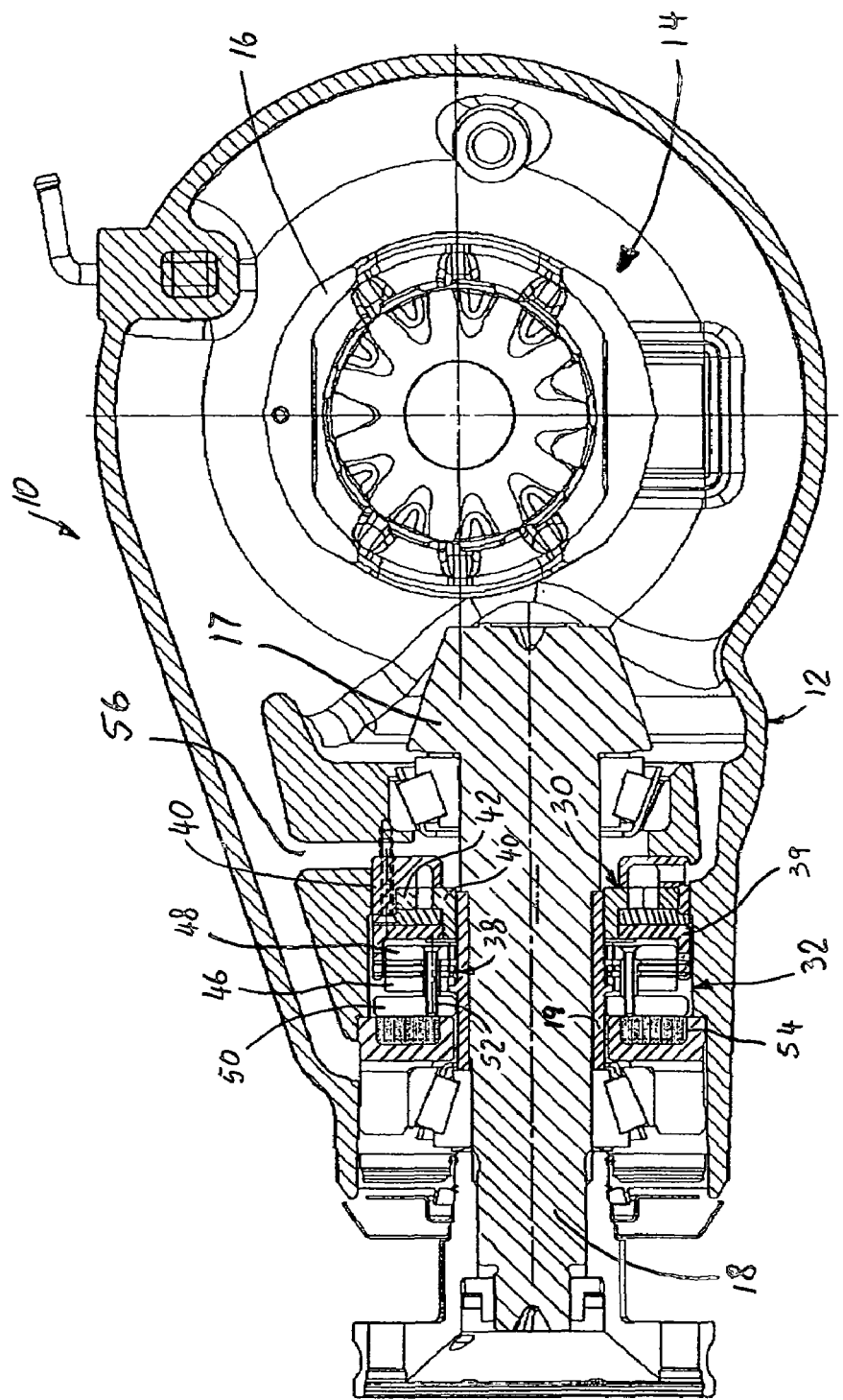
FIG. 2 is a cross sectional view of the drive axle assembly of the present invention taken along the line 2-2 in FIG. 1.

The drive axle assembly 10 further comprises an auxiliary electromagnetic clutch 32 provided to selectively actuate the hydraulic pump 30 by non-rotatably coupling the inner rotor 44 of the hydraulic pump 30 to the input shaft 18. The electromagnetic clutch 32, illustrated in detail in FIG. 2, is mounted about the input shaft 18 and comprises a clutch pack 38 disposed between a fixed ring 46 and a slidable pressure ring 48, an armature ring 50 connected to the pressure ring 48 through connecting pins 45, and an electromagnetic coil 54. The clutch pack 38 is disposed within a clutch casing 39 which, in turn, is disposed inside the axle housing 12 about the input shaft 18. The clutch pack 38 includes sets of alternating outer friction plates and inner friction plates. Conventionally, an outer circumference of the outer friction plates is provided with projections that non-rotatably engage corresponding grooves formed in an inner peripheral surface of the clutch casing 39. Similarly, an inner circumference of the inner friction plates is provided with projections that non-rotatably engage corresponding grooves formed in a drive sleeve 19 non-rotatably coupled to the input shaft 18. At the same time, the friction plates of the clutch pack 38 are slidable in the axial direction along the input shaft 18. The clutch casing 39 is non-rotatably coupled to the inner rotor 44 of the hydraulic pump 30. Thus, the hydraulic pump 30 is selectively actuated by frictionally loading the clutch pack 38 of the electromagnetic clutch 32 to non-rotatably couple the inner rotor 44 of the hydraulic pump 30 to the input shaft 18 through the drive sleeve 19 and the clutch casing 39.

The electro-magnetic coil 54, hence the electromagnetic clutch 32, is electronically controlled by an electronic control module (ECM) 70 (shown in FIG. 3) based on one or more vehicle parameters as control inputs 72, such as a vehicle speed, a wheel speed difference, a vehicle yaw rate, a vehicle lateral acceleration, a steering angle, an engine throttle position, a brake application, an ice detection, a vehicle driveline configuration, hydraulic fluid temperature and/or pressure, a stability control system actuation, etc. When energized by a control signal from the ECM 70, the electromagnetic coil 54 attracts the armature ring 50 and the slidable pressure ring 48, which presses the friction plates of the clutch pack 38 against the fixed ring 46 to frictionally load (engage) the clutch pack 38 in order to drivingly couple the input shaft 18 and the hydraulic pump 30, thus actuating the hydraulic pump 30 to generate pressurized hydraulic fluid.

The hydraulic pump 30 is actuated by the ECM 70 through the electromagnetic clutch 32 only when the pressure buildup in the accumulator 34 is required, i.e. when the pressure within the accumulator 34 is below a predetermined level. When the predetermined pressure level in the accumulator 34 is reached, the hydraulic pump 30 is turned off by disengaging the electromagnetic clutch 32 when the fluid pressure is not required, thus reducing parasitic losses in the drive axle assembly 10. In this case, the electromagnetic coil 54 is de-energized by the control signal from the ECM 70. When the hydraulic pump 30 is deactivated (turned off), the only loss of power is the drag on the open (disengaged) friction clutch 24 and the clutch pack 38 of the auxiliary clutch 32. Alternatively, the hydraulic flow from the hydraulic pump 30 can be directed to another area at a lower pressure, again increasing efficiency of a vehicular drive train.

The pressurized hydraulic fluid is supplied to the pressure accumulator 34 by the hydraulic pump 30 through an output passage 56 (shown in FIG. 2), preferably formed in the axle housing 12. The output passage 56 is in fluid communication with an outlet port of the hydraulic pump 30 and the pressure accumulator 50 through a check valve 58 (shown in FIG. 3). The fluid pressure source 26 of the clutch actuator assembly 25, illustrated in detail in FIG. 3, further includes flow regulation valves 60 and 62 (preferably each in the form of a solenoid operated 2-way, normally closed valve) and proportional, electric pressure relief valve 64 all selectively controlled by the ECM 70, The flow regulation valves 60 and 62 and the pressure relief valve 64 selectively fluidly connect the hydraulic pump 30 with a fluid reservoir (sump) 65 defined within the axle housing 12 for storing an appropriate amount of the hydraulic fluid used supply hydraulic fluid to the pump 30 for actuating the friction clutch 24. The clutch actuator assembly 25 further includes a hydraulic fluid cooler 66 fluidly connecting the hydraulic pump 30 with the fluid reservoir 65 through the flow regulation valve 62 and a pressure relief valve 67. The clutch actuator assembly 25 allows fluid, such as oil, to circulate through the cooler 66 when temperature of the axle fluid becomes excessively hot.

The flow regulation valve 60 is provided for selectively fluidly connect the pressure accumulator 34 with the piston assembly 36 through an inlet fluid passage 35, preferably formed in the axle housing 12, and to variably regulate the fluid pressure supplied to the piston assembly 36 in response to a signal from the ECM 70. The piston assembly 36 includes a hydraulically actuated piston 36a disposed within a piston housing 36b formed in the axle housing 12 and defining a piston pressure chamber 36c therebetween, and serves to compress the friction clutch 24 and retard any speed differential between the output axle shafts 20a and 20b. The pressurized hydraulic fluid to actuate the piston 36a and engage the friction clutch 24 is provided by the pressure accumulator 34. The pressurized fluid in the piston pressure chamber 36c creates an axial force upon the piston 36a for applying a compressive clutch engagement force on the friction clutch 24, thereby transferring drive torque between the output axle shafts 20a, 20b through the differential case 16. The amount of torque transfer (i.e., the torque ratio or split) is progressive and continuously variable and is proportional to the magnitude of the clutch engagement force exerted by the piston 36a on the friction clutch 24 which, in turn, is a function of the fluid pressure within the piston chamber 36c. Moreover, the magnitude of the fluid pressure within piston pressure chamber 36c, as delivered thereto by the hydraulic pressure accumulator 34, is controlled by the ECM 70 through the flow regulation valve 60. The ECM 70 controls the activation of the pressure to the friction clutch 24, the engagement of the friction clutch 24 and the auxiliary electromagnetic clutch 32, the flow of the axle fluid through the cooler 66, and the engagement of the pump 30.

Therefore, a coupling assembly in accordance with the present invention is provided with a novel arrangement including an auxiliary clutch for selectively activating a fluid pump for charging fluid pressure accumulator in fluid communication with a fluid clutch actuator axially loading a friction clutch, thus increasing efficiency of the coupling assembly by running the fluid pump only when it is required.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A coupling assembly comprising:
   an input shaft driven by a prime mover;
   at least one output shaft drivingly coupled to said input shaft;
   a fluid pump mounted to said input shaft and selectively driven by said input shaft through an auxiliary clutch;
   a friction clutch for selectively frictionally coupling said input shaft with said at least one output shaft; and
   a fluid clutch actuator for operating said friction clutch between a disengaged condition and an engaged condition;
   said fluid pump selectively communicating with said fluid clutch actuator for operating said friction clutch.

2. The friction coupling assembly as defined in claim 1, wherein said auxiliary clutch is an electro-magnetic clutch.

3. The friction coupling assembly as defined in claim 1, further comprising an input member driven by said input shaft and drivingly coupled to said at least one output shaft, wherein said friction clutch selectively frictionally couples said input member with said at least one output shaft.

4. The coupling assembly as defined in claim 3, wherein said friction clutch includes at least one first friction plate coupled to rotate with said at least one output shaft and at least one second friction plate coupled to rotate with said input member.

5. The coupling assembly as defined in claim 1, wherein said fluid pump is a gerotor pump.

6. The coupling assembly as defined in claim 1, wherein said fluid pump is mounted about said input shaft substantially coaxially therewith.

7. The coupling assembly as defined in claim 1, wherein said auxiliary clutch is mounted about said input shaft substantially coaxially therewith.

8. The coupling assembly as defined in claim 2, further including an electronic control unit for selectively controlling said auxiliary electromagnetic clutch for actuating said fluid pump.

9. The coupling assembly as defined in claim 8, wherein said electronic control unit selectively controls said auxiliary clutch in response to at least one operational parameter of said coupling assembly.

10. The coupling assembly as defined in claim 9, wherein said at least one operational parameter is at least one of a fluid temperature and a fluid pressure.

11. The coupling assembly as defined in claim 1, further comprising a fluid pressure accumulator in fluid communication with said fluid pump for storing the pressurized fluid generated by said fluid pump and with said fluid clutch actuator for setting said friction clutch in said engaged condition.

12. The coupling assembly as defined in claim 11, further comprising a flow regulation valve provided for selectively fluidly connecting at least one of said fluid pressure accumulator and said fluid pump with said fluid clutch actuator.

13. The coupling assembly as defined in claim 12, further comprising an electronic control unit for selectively controlling said flow regulation valve in order to variably regulate the fluid pressure supplied to said fluid clutch actuator in response to a signal from said electronic control unit.

14. The coupling assembly as defined in claim 13, wherein said electronic control unit selectively controls said flow regulation valve in response to at least one operational parameter of said coupling assembly.

15. The coupling assembly as defined in claim 14, wherein said coupling assembly is a drive axle of a motor vehicle, and said electronic control unit selectively controls said control valve in response to at least one operational parameter of said motor vehicle.

16. The coupling assembly as defined in claim 15, wherein said at least one operational parameter of said motor vehicle is selected from the group consisting of a vehicle speed, a wheel speed difference, a vehicle yaw rate, a steering angle, an engine throttle position, a vehicle lateral acceleration, a brake application, an ice detection, a driveline configuration, and yaw stability control system actuation.

17. The friction coupling assembly as defined in claim 14, wherein said input shaft is a pinion gear shaft driving a differential case and said at least one output shaft is an output axle shaft of said drive axle of said motor vehicle.

18. The friction coupling assembly as defined in claim 12, further including an electronic control unit for selectively controlling said auxiliary clutch and said control valve in order to variably regulate the fluid pressure supplied to said fluid clutch actuator in response to a signal from said electronic control unit.

19. The friction coupling assembly as defined in claim 18, wherein said electronic control unit selectively controls said auxiliary clutch and said control valve in response to at least one operational parameter of said gear drive unit.

20. The friction coupling assembly as defined in claim 1, wherein said fluid clutch actuator is in the form of a piston assembly for axially loading said friction clutch.

21. A drive axle assembly in a motor vehicle, said drive axle assembly comprising:
    a pinion shaft driven by a prime mover;
    a differential assembly including a differential case housing a differential gear mechanism operatively coupled to output axle shafts for allowing differential rotation thereof;
    a friction clutch for selectively coupling said differential case with one of said output axle shafts, said friction clutch includes a plurality of first function plates coupled to rotate with said differential case and a plurality of second friction plate coupled to rotate with one of said output axle shafts, said friction plates being frictionally engageable with one another; and
    a gerotor pump mounted about said pillion shaft substantially coaxially therewith and selectively driven by said input shaft through an auxiliary electro-magnetic clutch mounted about said pinion shaft substantially coaxially therewith:
    a fluid pressure accumulator in fluid communication with said gerotor pump for storing a pressurized fluid generated by said gerotor pump;
    a fluid clutch actuator in fluid communication with said gerotor pump and said pressure accumulator for operating said friction clutch between a disengaged condition and an engaged condition;
    a flow regulation valve provided for selectively fluidly connecting at least one of said fluid pressure accumulator and said fluid pump with said fluid clutch actuator:
    an electronic control unit for selectively controlling said electromagnetic clutch and said flow regulation valve in order to variably regulate the fluid pressure supplied to said fluid clutch actuator in response to a signal from said electronic control unit;
    said electronic control unit selectively controlling said electromagnetic clutch and said control valve in response to at least one operational parameter of said motor vehicle.

22. A coupling assembly comprising:
    an input shaft and an output shaft;
    a friction clutch for selectively drivingly engaging said input shaft with said output shaft;
    a pump mounted to said input shaft;
    an auxiliary clutch for selectively coupling said pump to said input shaft; and
    an actuator for operating said friction clutch between a disengaged condition and an engaged condition, said pump communicating with said actuator for operating said friction clutch.

* * * * *

UNITED STATES PATENT AND TRADEMARK OFFICE
CERTIFICATE OF CORRECTION

PATENT NO. : 7,534,193 B2  
APPLICATION NO. : 11/520026  
DATED : May 19, 2009  
INVENTOR(S) : Ralph Woodward Baxter, Jr., William Gordon Hunt and Randy L. Sommer It is certified that error appears in the above-identified patent and that said Letters Patent is hereby corrected as shown below:

Col. 7, line 28: please delete the word "function" and insert the word --friction--;

Col. 7, line 33: please delete the word "pillion" and insert the word --pinion--.

Signed and Sealed this

Fourth Day of August, 2009

JOHN DOLL  
*Acting Director of the United States Patent and Trademark Office*